July 19, 1966  ISAMU OHNO  3,262,039
DIRECT CURRENT GENERATOR
Filed Feb. 14, 1963  3 Sheets-Sheet 1

INVENTOR.
*Isamu Ohno*
BY
ATTORNEYS

July 19, 1966

ISAMU OHNO 3,262,039

DIRECT CURRENT GENERATOR

Filed Feb. 14, 1963

INVENTOR.
Isamu Ohno
BY
ATTORNEYS

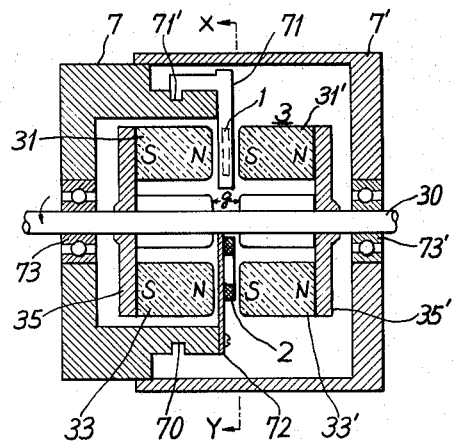
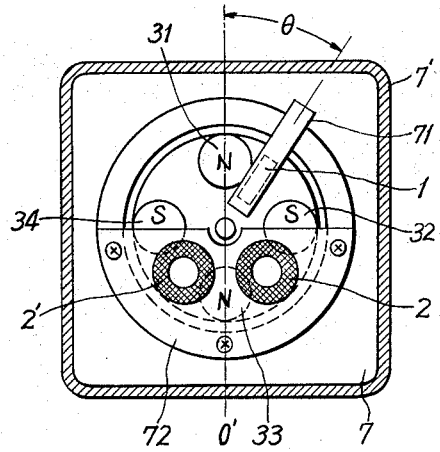
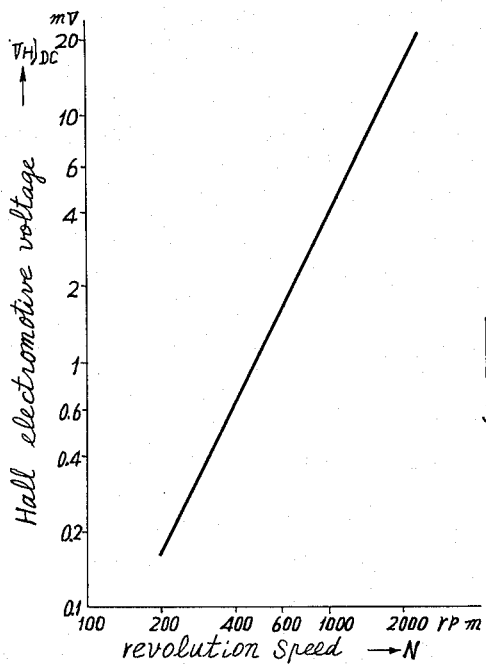
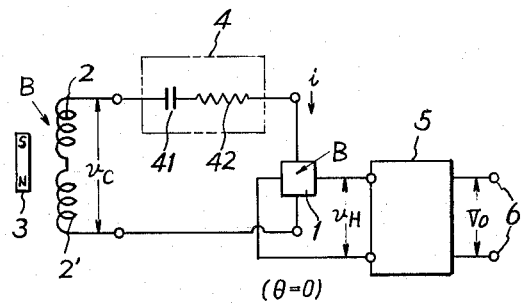

United States Patent Office 3,262,039
Patented July 19, 1966

3,262,039
DIRECT CURRENT GENERATOR
Isamu Ohno, Tokyo, Japan, assignor to Kabushikikaisha Yokogawa Denki Seisakusho (Yokogawa Electric Works Ltd.), Tokyo, Japan, a corporation of Japan
Filed Feb. 14, 1963, Ser. No. 258,435
Claims priority, application Japan, Feb. 26, 1962 (utility model), 37/8,454; July 13, 1962, 37/29,575
7 Claims. (Cl. 318—327)

This invention relates to a direct current generator and, more particularly to a direct current generator utilizing the power generation and commutation due to the Hall effect of semiconductor elements.

The principal object of this invention is to provide a direct current generator in which a direct current voltage is obtained as a function of the rotation speed and in which a driving torque is small and the precision is high without the disadvantages of a mechanical commutation system.

Other objects, features and advantages of this invention will become apparent from the following descriptions taken in conjunction with the accompanying drawings in which;

FIGURE 1 is a perspective view illustrating schematically the principle of the operation of the direct current generator according to this invention;

FIGURES 2-A and 2-B are respectively a schematic diagram and an electric circuit diagram of an example of this invention;

FIGURE 6 is a longitudinal cross-sectional view of the direct current generator of this invention, showing another example;

FIGURE 7 is the sectional view along the line X–Y of FIGURE 6;

FIGURE 8 is their electric circuit diagram; and

FIGURE 9 is a graph showing a characteristic of the direct current generator according to this invention.

Figure 1:
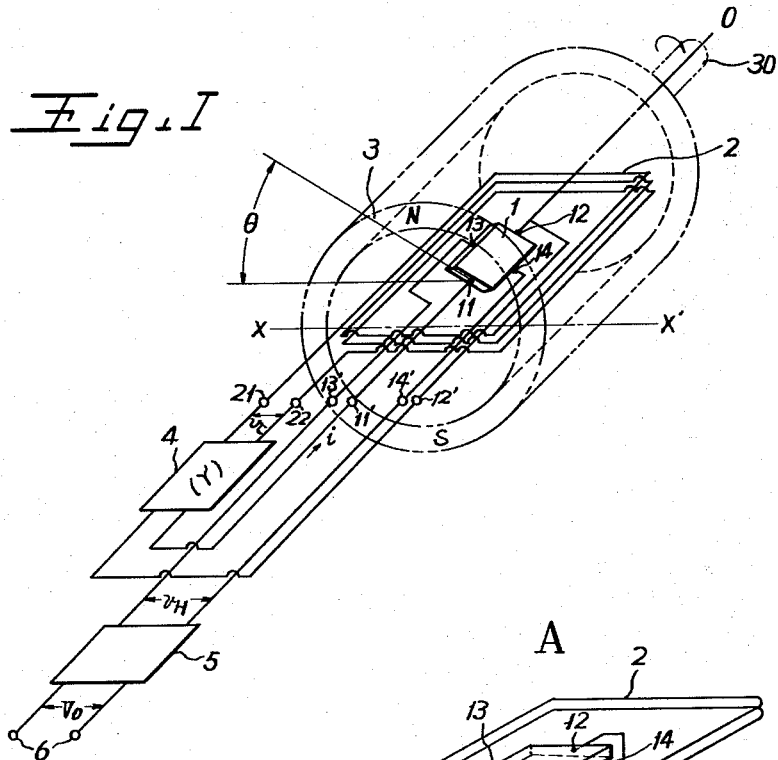

Referring now to FIGURE 1, 1 is a thin rectangular plate element (hereinafter referred to as a Hall plate) which is made of a semiconductor having high Hall effect, for example germanium, and a pair of current terminals 11, 12 and voltage terminals 13 and 14 respectively are provided at the opposite faces of the element. 2 is a coil, 3 is a rotary cylindrical magnet mounted on a rotary shaft 30, and the inner surface of the magnet 3 is magnetized in such a way that the greater part of one side defined by the plane X–X' including the rotation axis O is magnetized as the N-pole and that of the other side is as the S-pole. In the space within the cylinder accordingly, there is established a magnetic field and the magnetic flux is distributed, which intersects with the aforesaid plane X–X' substantially at right angles thereto. The Hall plate 1 and the coil 2 are so arranged that their planes cross each other at a certain angle $\theta$, and fixed in the magnetic field. Consequently, as the magnet 3 rotates, the magnetic field therein also rotates and the Hall plate 1 and the coil 2 are affected by this rotating magnetic field. Although the magnet 3 is shown as cylindrical, other appropriate shapes may be employed. In short, it is sufficient merely to form the magnet 3 in such a manner that the magnetic field which is applied to the Hall plate and the coil 2 may vary in polarity alternately. 4 is an electrical network including a resistor, an inductor and/or a capacitor. Both ends 21 and 22 of the coil 2 are connected to the input ends of the network 4, and in turn the output ends of the network 4 are connected through terminals 11' and 12' to current terminals 11 and 12 of the Hall plate 1. A pair of voltage terminals 13 and 14 of the Hall plate 1 are connected through terminals 13' and 14' to a low-pass filter circuit 5. 6 is an output terminal of the low-pass filter circuit 5.

The operation of the direct current generator constructed as described above is as follows:

Firstly, when the cylindrical rotary magnet 3 rotates in the direction marked with the arrow, the magnetic flux in the space of the cylinder affecting the coil 2 is expressed by the following formula, in which the magnetic flux per unit area is B;

$$B = Bm \sin 2\pi Nt \qquad (1)$$

where $Bm$ is the magnetic flux density at the cross-section X–X' of the magnet in the space where the coil 2 is placed, N is the revolving speed of the magnet 3, and $t$ is time.

Therefore, a voltage $v_c$ produced across the terminals 21 and 22 of the coil 2 is given by the following formula.

$$v_c = -naBm2\pi N \sin (2\pi Nt + \pi/2) \qquad (2)$$

where $n$ is the number of turn of the coil 2, and $a$ is its area.

That is, the voltage $v_c$ is an alternating voltage having an amplitude and frequency proportional to the revolving speed N and has a phase difference of $\pi/2$ with respect to the aforementioned alternating magnetic flux B. Consequently the above Formula 2 can be expressed by $$v_c = V_c \sin (\omega t + \pi/2) \qquad (3)$$

where $$\left. \begin{array}{l} V_c = -naBm2\pi N \\ \omega = 2\pi N \end{array} \right\} \qquad (4)$$

Furthermore, the above Formula 3 can be expressed in the vector symbol as follows:

$$\dot{V}_c = V_c \angle \pi/2 \qquad (3')$$

Next, the transfer function $\dot{Y}$ which is expressed as an admittance between the input voltage and the output current in the network 4 is given by the following formula.

$$\dot{Y} = Y \angle \phi \qquad (5)$$

where Y is the absolute value of admittance and $\phi$ is a phase angle, the both being functions of $\omega$, namely the revolving speed. When the voltage $\dot{V}_c$ is added to the input end of the network 4 having the above frequency characteristics and an output current of the network 4 is supplied to the Hall plate 1, a current $i$ flowing across the current terminals 11 and 12 of the Hall plate 1 is expressed by a vector $\dot{i}$ as follows:

$$i = V_c Y \sin (\omega t + \phi + \pi/2) \qquad (6)$$
$$\dot{i} = \dot{V}_c \dot{Y} = V_c Y \angle (\phi + \pi/2) \qquad (6')$$

That is, the amplitude and the phase of the current I with respect to the voltage $V_c$ varies with the characteristics of the network 4. Furthermore, if the deviation angle between the planes of the Hall plate and the coil 2 is $\theta$, the magnetic flux density B' acting upon the Hall plate 1 is therefore delayed in phase by $\theta$ with respect to the magnetic flux density B affecting the coil 2. That is, $$B' = Bm \sin (2\pi Nt - \theta) \qquad (1')$$

Hence, the Hall electromotive force $v_H$ produced across the voltage terminals 13 and 14 of the Hall plate 1 is given by the following formula.

$$v_H = K_H i B' \qquad (7)$$

where $K_H$ is a proportional constant determined by the Hall constant and the thickness of the Hall plate 1, etc.

Substituting the Formulas 1' and 6 in the above Formula 7 respectively, the following formula will be given.

$$v_H = \tfrac{1}{2} K_H V_c Y Bm \{\cos(\pi/2 + \phi + \theta) - \cos(2\omega t + \pi/2 + \phi - \theta)\} \quad (8)$$

The first term of the right of the above Formula 8 shows a direct current component and the second term an alternating current component. If the direct current component is $[V_H]_{DC}$, it is expressed by the following formula.

$$[V_H]_{DC} = \tfrac{1}{2} K_H V_c Y Bm \cos(\pi/2 + \phi + \theta) \quad (8')$$

Accordingly, if the Hall electromotive force $v_H$ is added to the low-pass filter circuit 5, then a direct current voltage $V_o$ which corresponds to the voltage given by the above Formula 8' can be delivered from its terminal 6 and the amount of this voltage $V_o$ varies in accordance with the characteristics of the network 4 and the angle $\theta$ formed between the Hall plate 1 and the coil 2. In other words, by selecting the characteristics of the network 4 and the angle $\theta$ suitable, a specific functional relation can be made between the revolving speed and the output direct current voltage.

Next, some of relatively simple embodiments of this invention will hereinbelow be explained so as to clarify the above functional relation.

Figure 2:
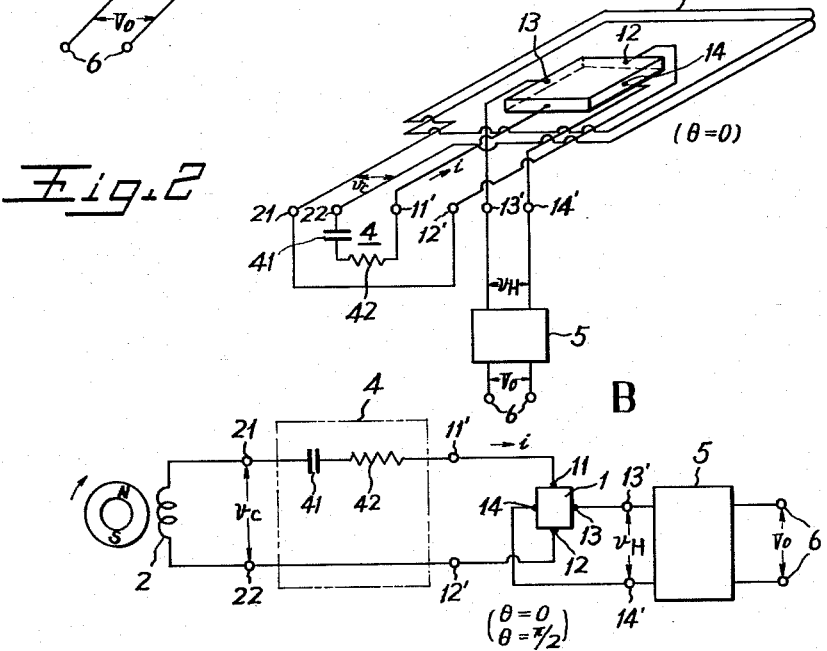

FIGURES 2-A and 2-B are respectively a schematic diagram and an electric circuit diagram of a direct current generator in which a direct current output proportional to the square of the revolution speed is obtained. In this example, a Hall plate 1 and a coil 2 are on the same plane, namely the deviation angle $\theta$ between the two is 0 degree, and the network 4 is composed of a differentiation circuit of the first order consisting of a capacitor 41 and a resistor 42. In FIGURE 2, elements performing the same functions as those in FIGURE 1 are marked with the same numeral references and their further explanations are omitted. In FIGURE 2-A, the part corresponding to the rotary magnet 3 in FIGURE 1 is omitted for the sake of simplicity but the Hall plate 1 and the coil 2 is considered to be located in the magnetic field in the cylinder of a two-pole rotary magnet 3 as in FIGURE 1.

Figure 3:
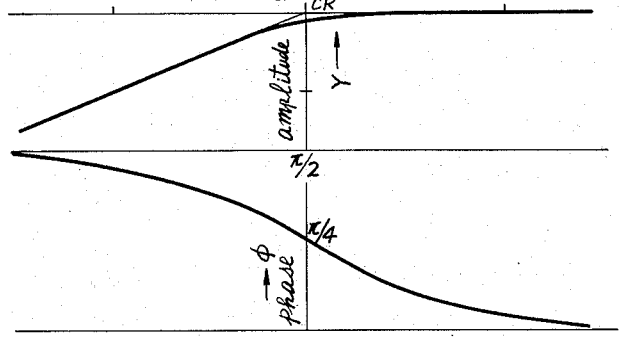
FIGURE 3 is a graph showing the characteristics of a network applied to this invention.

Now, the characteristics of the differentiation circuit of the first order 4 in the direct current generator constructed as described above will hereinbelow be analysed. If the capacitance value of the capacitor 41 is C and the total sum of the respective resistance values of the resistor 42 and the coil and the internal resistance of the Hall plate is R, the transfer function $\dot{Y}$ of an output current $i$ with respect to an input voltage $v_c$ of the differentiation circuit of the first order is expressed by the following formula, and this is shown in FIGURE 3.

$$\left.\begin{array}{l} Y = \dfrac{\omega C}{\sqrt{1+\omega^2 C^2 R^2}} \\ \phi = \tan^{-1} \dfrac{1}{\omega CR} \end{array}\right\} \quad (9)$$

By substituting the constants of the above Formula 9 in the Formula 8', the following formula is given.

$$[V_H]_{DC} = \dfrac{\tfrac{1}{2} K_H n a B m^2 \omega^2 C}{1+\omega^2 C^2 R^2} (\cos\theta + \omega CR \sin\theta) \quad (10)$$

Here, the following relation is established between the time constant CR and the maximum angular frequency $\omega m$ of an induced voltage $v_c$, $$CR \ll \dfrac{1}{\omega m} \quad (11)$$

and since the angle $\theta$ between the Hall plate 1 and the coil 2 is 0, the direct current component of the Hall electromotive force $V_H$ can be given by the following formula from the above Formula 10.

$$[V_H]_{DC} = \tfrac{1}{2} K_H n a B m^2 \omega^2 C \quad (12)$$

That is, in order to allow the square characteristic exactly between the direct current voltage $V_o$ to be obtained across output terminals 6 and the revolution speed N, it is required that $\theta = 0$ and that the above Formula 11 is completely satisfied. If, however, the Formula 11 is not completely satisfied, namely in case $\omega^2 C^2 R^2$ of the denominator of the Formula 10 is not negligible as compared with 1, an error is caused in the above square characteristic. In this case, however, by compensating the angle $\theta$ from 0 degree to some minor value, for instance $\pm 10$ degrees, such an error can be reduced as small as possible.

Next, when the differentiation circuit of the first order is used as the network 4 as described above and the deviation angle $\theta$ is made $\pi/2$, it follows that $$[V_H]_{DC} = \tfrac{1}{2} K_H n a B m^2 \omega^3 C^2 R \quad (13)$$

and the output voltage $V_o$ in this case is proportioned to the cube of the revolution speed N. As is apparent from the above Formulas 12 and 13 in the range where the Formula 11 is established practically, output voltages proportional to the square or the cube of the revolution speed N can be picked up only by changing the deviation angle $\theta$.

Figure 4:
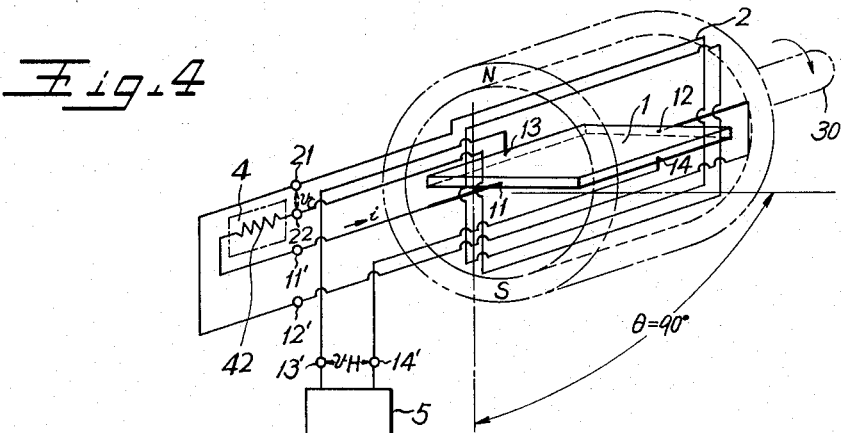
FIGURE 4 is a schematic diagram illustrating another example of this invention.

FIGURE 4 is a schematic diagram of a direct current generator to obtain a direct current output proportioned to the revolution speed, in which the deviation angle formed between the Hall plate 1 and the coil 2 is 90° and the network 4 is composed of a resistor 42 only (but the resistance of the coil and the internal resistance of the Hall plate are to be included therein). In FIGURE 4 elements performing the same functions as those in FIGURE 1 are marked with the same numeral references. In the case where the network 4 is composed of the resistor 42 only, the transfer function $\dot{Y}$ is expressed by the following formula.

$$\left.\begin{array}{l} \dot{Y} = 1/R \\ \phi = 0 \end{array}\right\} \quad (14)$$

Substituting the above Formula 14 into the aforementioned formula 8', the following formula is obtained.

$$[V_H]_{DC} = 1/2R \, K_H n a B m^2 \omega \quad (15)$$

Namely, a direct current output voltage $V_o$ to be obtained across the output terminals 6 is proportional to the revolution speed N.

Figure 5:
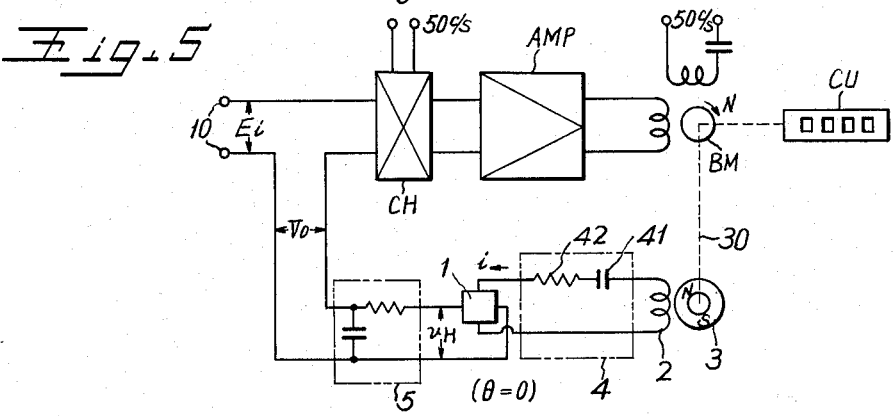
FIGURE 5 is an electric circuit diagram showing a further example to which this invention is applied.

FIGURE 5 is an electrical circuit diagram illustrating an example how to apply the direct current generator in the type constructed as shown in FIGURE 2 to an integrating device for obtaining an integration value of the revolution speed N proportional to the square root of an input voltage. In this Figure, 10 designates input terminals for a direct current voltage $E_i$ to be impressed into, CH is a D.C.-A.C. converter, AMP is an alternating current amplifier and BM is an A.C. variable speed motor. The rotary shaft of the motor BM is connected mechanically to the rotary shaft 30 of a rotary magnet 3 and the connection is such that the output direct current voltage $V_o$ of the low-pass filter circuit 5 is added differentially to the input direct current voltage $E_i$ thereof, forming a negative feedback circuit. When the deviation angle $\theta$ of the coil 2 and the Hall plate 1 is 0, namely at the time when the relation of $V_o \propto N^2$ is constituted between the revolution speed N of the rotary magnet 3 and the voltage $V_o$, if the loop gain including the feedback circuit is sufficiently large, the following relationship is made up between the revolution speed and of the motor BM and the input voltage $E_i$ in the state of equilibrium ($E_i \doteqdot V_o$) of the circuit.

$$N \propto \sqrt{E_i}$$

when $$E_i \gtreqless 0$$

That is, the revolution speed N of the motor BM is in proportion to the square root of the input voltage $E_i$. Therefore, if a voltage detected by a differential pressure type flow meter signal generator, namely a voltage ($E_i \propto Q^2$) proportional to the square of the quantity of flow Q to be measured is used as the input voltage $E_i$, the output revolution speed N can be obtained in proportion to the quantity of flow Q to be measured. Hence if an integrating counter CU is used to indicate the integration of the revolving speed, there is provided an integrating meter for a differentiation pressure type flow meter.

In the above integrating device shown in FIGURE 5, the D.C.-A.C. converter CH and the A.C. amplifier AMP can be dispensed with, if a variable speed type D.C. motor is employed instead of the alternating current motor BM. In this case, the variable speed type D.C. motor can be operated by the direct current source 10 through any desired D.C. amplifier, the other connection being maintained as shown by FIGURE 5.

In the foregoing descriptions of the exemplified constructions, the rotary magnets 3 are two-pole magnets which are magnetized to the N and S poles. It can be possible that the number of the poles are increased, namely making the magnet multipolar, and the frequency of the voltage $v_c$ to be induced in the coil 2 is increased, thereby reducing the values of the capacitance C, resistance R and inductance L in the network 4.

FIGURE 6 is a side cross-sectional view illustrating another example of the direct current generator of this invention and FIGURE 7 is its cross-sectional view along the line X–Y. In these figures, 31, 31', 32, 33, 33', and 34, are four pairs of magnets respectively magnetized to the N and S poles and these pairs of the magnets are mounted on the peripheries of disc shaped yokes 35 and 35', being angularly spaced by 90 degrees. The magnets of each pair (for example 31 and 31') are so positioned as to be opposite in polarity to each other, and the immediately adjacent magnets (for instance, 31 and 32) are also placed so as to be opposite in polarity each other. The center of the yokes 35 and 35' are respectively fixed on the rotary shaft 30. Thus, the above parts constitute a four-pole rotary magnet 3. That is, this structure is such that the direction of the magnetic field is made parallel to the rotary shaft, and hence this example is different from that of FIGURE 1 in this point. 7 and 7' are outside housings, and the rotary shaft 30 is supported by bearings 73 and 73' built in the housings 7 and 7'. 71 is a case of a non-magnetic material in one end of which a Hall plate 1 is enclosed, and a hook portion 71' formed on the other end of the case 71 is fitted into a groove on the housing 7, and the case 71 is so arranged as to revolve along the groove 70 of the housing 71. 72 is a supporting plate of a non-magnetic material on which two coils 2 and 2' are fixed spaced from each other at an interval of 90°, said supporting plate 72 being fixed on to the housing 7 in the air gap g. An alternating magnetic field produced in the air gap g with the rotation of the rotary shaft 30 and the pairs of the magnets, acts upon the coils 2 and 2' and the Hall plate 1.

FIGURE 8 illustrates an electric connection diagram of the Hall plate 1 and the coils 2 and 2' of the direct current generator constructed as shown in FIGURES 6 and 7. That is, the coils 2 and 2' are connected in series, the both ends of which are connected through the network 4 across the current terminals of the Hall plate 1. The voltage terminal of the Hall plate 1 is connected through the low-pass filter circuit 5 to the output terminals 6. If now an alternating magnetic field is produced in the air gap g with the rotation of the four pairs of the magnets on the rotary shaft 30 and an alternating magnetic flux B due to the magnetic field acts upon the coils 2 and 2' and the Hall plate 1, the sum $V_c$ of voltages to be induced in the coils 2 and 2' is an alternating voltage the amplitude and the frequency of which are in proportion to the aforementioned revolution speed N. The voltage $V_c$ is supplied across the current terminals of the Hall plate 1 through the network 4 (in this case the differentiation circuit of the first order of CR is illustrated), whereby a current $i$ flows. Then the Hall electromotive force produced across the voltage terminals of the Hall plate 1 is obtained at the terminal 6 through the filter circuit 5. In this case, when the deviation angle $\theta$ (refer to FIGURE 7) of the Hall plate with respect to the line O–O' (a standard line) running in the middle between the coils 2 and 2', is 0, the Hall electromotive force $[V_H]_{DC}$ is produced corresponding to the above Formula 12 and an output direct current $V_0$ to be obtained at the terminal 6 is to be a direct current voltage proportioned to the square of the revolving speed N. However, the above relation is the same as has been explained in connection with FIGURE 2. The compensation for the square characteristic is also the same as has been described above. Furthermore, in the direct current generator shown in FIGURES 6 and 7, if the network 4 is composed of a differentiation circuit of the first order as described in FIGURE 2 and $\theta = 45$ degrees, the output $V_0$ is proportioned to the cube of the revolution speed N. Besides, if the network 4 is a resistance element alone and $\theta = 45$ degrees, an output $V_0$ is obtained in proportion to the revolution speed N.

In a modification of the direct current generator constructed as shown in FIGURES 6 and 7, two pairs of coils and Hall plates are arranged in combination in the air gap magnetic field of the rotary magnet, thereby obtaining two output direct currents which are independent of each other. For example, a direct current output proportional to the square of the revolution speed can be obtained by one pair of the coil and the Hall plate and another direct current output proportional to the revolution speed can simultaneously be obtained by the other pair of the coil and the Hall plate.

Some numerical examples will hereinbelow be explained which were designed on the basis of the structure of the direct current generator illustrated in FIGURES 6 and 7. In a rotary magnet assembly 3 in which four pairs of columnar permanent magnets of 11 mm. in diameter and 15 mm. in length were mounted on the peripheries of a pair of yokes of 36 mm. in diameter, respectively angularly spaced from the adjacent ones by 90 degrees and the air gap g was 3.5 mm., a magnetic flux density of 4000 gausses at maxium was obtained. Furthermore, the coils 2 and 2' were each of 900 turns of 0.09 mm$\phi$ wound a flat ring shaped coil frame (2 mm. in width, 6 mm. inside diameter and 17 mm. outside diameter), and these two coils were arranged angularly spaced by 90 degrees and electrically connected in series with each other. In this case, the total sum of their coil resistances was about 180Ω. Then, a thin plate (5 x 3 x 0.15 mm.) of n-type germanium was employed as the Hall plate 1 and this was moulded in alaldyte to be of the dimension of 10 mm$\phi$ x 0.45 mm. The characteristics were as follows:

Hall plate constant $K_H$: 1.56 mv./ma. Kgauss
Internal resistance across the current terminals: 166Ω
Internal resistance across the voltage terminals: 157Ω
Specific resistance: 0.7 Ω-cm.

In an experiment in which the aforementioned coils 2 and 2' and the Hall plate 1 were disposed in the air gap g (where $\theta = 0$) and as the network 4 the capacitor 41 having the capacity value of 0.6 μf. and the resistor 42 which was composed of the sum of the aforesaid coil resistance and the internal resistance of the Hall plate were used, a relationship (a square characteristic) such as shown in FIGURE 9 was observed between the revolution speed N of the rotary magnet 3 and the output voltage $[V_H]_{DC}$ of the Hall plate 1 and the expected objects were attained.

As has been described in the foregoing, in the direct current generator of this invention all the disadvantages such as loose contact of a brush, wear, spark and so on are removed because any mechanical commutation systems using a commutator, a brush or the like are not employed therein. Furthermore, any iron core is not placed in the air gap between magnetic poles, and hence no magnetic reaction is produced, so that the torque for driving a rotary magnet can be made very small. Besides, since there is no hysterisis phenomenon and influence of an eddy current, the waveform of an alternating voltage to be induced in coils is not distorted by the revolution speed. The Hall plate causes to perform a kind of commutation by the multiplication of an alternating magnetic flux and an alternating current synchronizing therewith, but this commutation by the Hall plate does not vary in efficiency with the amount of signals as in a diode or a selenium rectifier and it has always a constant commutating efficiency, accordingly a revolution speed function generator can be obtained in a wide range from a low speed to a high speed. Therefore, the direct current generator of this invention is very effective for use as a generator for a speed meter and a speed function generator, an integrator or the like such that extremely high precision is required therein.

It will be apparent that many modifications and variations may be effected without departing from the novel concept of this invention.

What is claimed is:

1. A direct current generator comprising a Hall plate having current terminals and voltage terminals, a coil, a rotoary magnet for establishing rotating magnetic field, said Hall plate and said coil being arranged with a desired electrical phase angle relation in said rotating magnetic field, a network including a reactance element, both ends of said coil being connected through said network to said current terminals of said Hall plate, and a low-pass filter circuit, the input terminals of said low-pass filter circuit, being connected to said voltage terminals of said Hall plate, thereby obtaining a direct current in proportion to a desired function of the revolution speed of said rotary magnet from the output terminals of said filter circuit.

2. A direct current generator as claimed in claim 1, wherein said Hall plate is positioned in a plane which is parallel to a plane including said coil.

3. A direct current generator as claimed in claim 1, wherein said Hall plate is disposed in the plane deviated by a certain angle with respect to the plane of said coil.

4. A direct current generator comprising a rotary cylindrical magnet, a Hall element having current terminals and voltage terminals, a coil, said Hall plate and said coil being positioned in the internal magnetic field established by said rotary cylindrical magnet, an alternating voltage induced in said coil by an alternating magnetic flux of a frequency proportional to the revolution speed of said rotary cylindrical magnet being applied across said current terminals of the Hall plate, thereby a Hall electromotive force being produced in proportion to the product of a current corresponding to said alternating voltage and said alternating magnetic flux, and means for obtaining the direct current component alone of said Hall electromotive force.

5. A generator comprising a rotary magnet assembly having a plurality of magnet groups, two opposite disc shaped yokes, said plurality of magnet groups being respectively mounted on the peripheries of said two opposite disc shaped yokes in such a manner that the magnets on one yoke are respectively aligned with the magnets on the other yoke apart from a certain air gap, a rotary shaft on which said two opposite disc shaped yokes are mounted, so that the direction of the magnetic field established in said air gap by the magnetic poles of said rotary magnet assembly are made parallel to the rotary shaft, a coil and a Hall plate are disposed corresponding to said magnetic poles and in a plane which is perpendicular to said rotary shaft in said air gap, and an electric network, through which an alternating voltage induced in said coil is supplied to said Hall plate.

6. An electrical circuit for an integrating device obtaining an integration value of the revolution speed which is proportional to the square root of an input voltage, comprising a direct current generator having a Hall plate having current terminals and voltage terminals, a coil, a rotary magnet for establishing rotating magnetic field, said Hall plate and said coil being arranged with a desired electrical phase angle relation in said rotating magnetic field, a network including a reactance element, both ends of said coil being connected through said network to said current terminals of said Hall plate, and a low-pass filter circuit, the input terminals of said low-pass filter circuit being connected to said voltage terminals of said Hall plate, thereby obtaining a direct current in proportion to a desired function of the revolution speed of said rotary magnet from the output terminals of said filter circuit, a direct current source, a direct current amplifier connected to said direct current source, a variable speed type direct current motor connected to the output side of said direct current amplifier, a counter for indicating the revolution speed of said variable speed type direct current motor, and means for feeding back the direct current output of said low-pass filter circuit to said direct current source.

7. An electrical circuit for an integrating device obtaining an integration value of the revolution speed which is proportional to the square root of an input voltage, comprising a direct current generator having a Hall plate having current terminals and voltage terminals, a coil, a rotary magnet for establishing rotating magnetic field, said Hall plate and said coil being arranged with a desired electrical phase angle relation in said rotating magnetic field, a network including a reactance element, both ends of said coil being connected through said network to said current terminals of said Hall plate, and a low-pass filter circuit, the input terminals of said low-pass filter circuit being connected to said voltage terminals of said Hall plate, thereby obtaining a direct current in proportion to a desired function of the revolution speed of said rotary magnet from the output terminals of said filter circuit, a direct current source. a D.C.-A.C. converter connected to said direct current source, a variable speed type alternating current motor connected to the output side of said D.C.-A.C. converter, a counter for indicating the revolution speed of said variable speed type alternating current motor, and means for feeding back the direct current output of said low-pass filter circuit to said direct current source.

References Cited by the Examiner
UNITED STATES PATENTS
2,512,325 6/1950 Hansen _____ 310—72

JOHN F. COUCH, *Primary Examiner.*
LLOYD McCOLLUM, *Examiner.*
W. H. BEHA, *Assistant Examiner.*